United States Patent
Okumura et al.

(10) Patent No.: US 7,680,403 B2
(45) Date of Patent: Mar. 16, 2010

(54) IMAGE PICKUP APPARATUS CONTROLLING SHAKE SENSING AND/OR SHAKE COMPENSATION DURING DUST REMOVAL

(75) Inventors: Yoichiro Okumura, Hino (JP); Yoji Watanabe, Fuchu (JP); Kazuo Mikami, Iruma (JP)

(73) Assignee: Olympus Imaging Corp., Tokyo (JP)

( * ) Notice: Subject to any disclaimer, the term of this patent is extended or adjusted under 35 U.S.C. 154(b) by 302 days.

(21) Appl. No.: 11/823,624

(22) Filed: Jun. 26, 2007

(65) Prior Publication Data

US 2008/0037980 A1    Feb. 14, 2008

Related U.S. Application Data

(60) Provisional application No. 60/837,826, filed on Aug. 14, 2006.

(30) Foreign Application Priority Data

Jul. 19, 2006   (JP) .............................. 2006-197044

(51) Int. Cl.
   *G03B 17/00*   (2006.01)
(52) U.S. Cl. ...................... 396/55; 396/52; 348/208.99; 348/208.12
(58) Field of Classification Search .................... 396/55
   See application file for complete search history.

(56) References Cited

U.S. PATENT DOCUMENTS 5,294,991 A * 3/1994 Oshima et al. ........... 348/208.5

2005/0264656 A1* 12/2005 Seo et al. ................. 348/219.1
2006/0279638 A1* 12/2006 Matsuda et al. .......... 348/208.7

FOREIGN PATENT DOCUMENTS

JP    2005-159711    6/2005

OTHER PUBLICATIONS

Sensor cleaning tips from impulseadventure.com; obtained from http://web.archive.org/web/20051122135748/http://www.impulseadventure.com/photo/sensor-dust-clean.html ; dated Nov. 22, 2005.*

* cited by examiner

*Primary Examiner*—W. B. Perkey
*Assistant Examiner*—Bret Adams
(74) *Attorney, Agent, or Firm*—Straub & Pokotylo; John C. Pokotylo

(57) ABSTRACT

In order to efficiently remove dust, an image pick up apparatus is provided with an image sensor for acquiring subject images via a photographing lens, a shift mechanism, holding the image sensor, capable of moving the image sensor in a first direction orthogonal to the optical axis of the photographing lens, and in a second direction that is different from the first direction, a sensor arranged in front of the image sensor, for detecting vibration applied to the optical element that is displaced by the shift mechanism together with the image sensor, and a controller for driving the shift mechanism according to output of the sensor for detecting vibration when operation is carried out to prevent image shake due to vibration applied to the image pickup apparatus, and moving the shift mechanism in accordance with a specified pattern regardless of sensor output when carrying out a dust removal operation for removing dust that has become attached to the surface of the optical element.

19 Claims, 7 Drawing Sheets

IMAGE PICKUP APPARATUS CONTROLLING SHAKE SENSING AND/OR SHAKE COMPENSATION DURING DUST REMOVAL

Benefit is claimed, under 35 U.S.C. §119, to the filing date of U.S. provisional patent application Ser. No. 60/837,826, titled "Imaging Capturing Apparatus", filed on Aug. 14, 2006, and listing Yoichiro OKUMURA, Yoji WATANABE and Kazuo MIKAMI as the inventors, for any inventions disclosed in the manner provided by 35 U.S.C. §112, ¶1. Benefit is also claimed, under 35 U.S.C. §119, to the filing date of prior Japanese Patent Application No. 2006-197044, filed on Jul. 19, 2006. These applications are expressly incorporated herein by reference. The scope of the present invention is not limited to any requirements of the specific embodiments described in these applications.

BACKGROUND OF THE INVENTION

1. Field of the Invention

The present invention relates to an image pickup apparatus, and particularly relates to an image pickup apparatus capable of eliminating dust that has become attached to an imaging surface of an image sensor of the image pickup apparatus, or optical members arranged in front of the imaging surface.

2. Description of the Related Art

If dust becomes attached to optical elements arranged close to an imaging surface of an image sensor in an image pickup device, such as a digital camera, there is a potential problem that image quality will be impaired by shadows of the dust being seen in prints. As a first method of solving this problem, there is a structure making the image sensor unit as air-tight as possible. As a second method, with a single lens reflex camera with interchangeable lenses, for example, there is known a method of exposing the image sensor to the outside using a special operating mode with the lens removed from the camera body, and blowing off dust that has become attached to the image sensor surface using a blower or the like.

Also, as a another method for solving the problem, Japanese patent laid-open No. 2005-159711 (laid-open Jun. 16, 2005) discloses, in a camera having a so called compensation mechanism for camera-shake that performs compensation for camera shake by shifting an image sensor along a surface orthogonal to the photography optical axis in response to output of a sensor for detecting camera-shake, technology for removing dust that has become attached to the imaging surface by vibrating the image sensor using the image sensor shift mechanism.

SUMMARY OF THE INVENTION

An object of the present invention is to provide an imaging apparatus that efficiently removes dust.

An imaging apparatus of the present invention comprises an image sensor for acquiring subject images via a photographing lens, a shift mechanism, holding the image sensor, capable of moving the image sensor in a first direction orthogonal to the optical axis of the photographing lens, and in a second direction that is different from the first direction, an optical element, arranged in front of the image sensor, that is displaced by the shift mechanism together with the image sensor, a sensor for detecting vibration applied to the imaging apparatus, and a controller for driving the shift mechanism according to output of the sensor when operation is carried out to prevent image shake due to vibration applied to the imaging apparatus, and moving the shift mechanism in accordance with a specified pattern regardless of sensor output when carrying out a dust removal operation for removing dust that has become attached to the surface of the optical element.

DETAILED DESCRIPTION OF THE PREFERRED EMBODIMENTS

Figure 1:
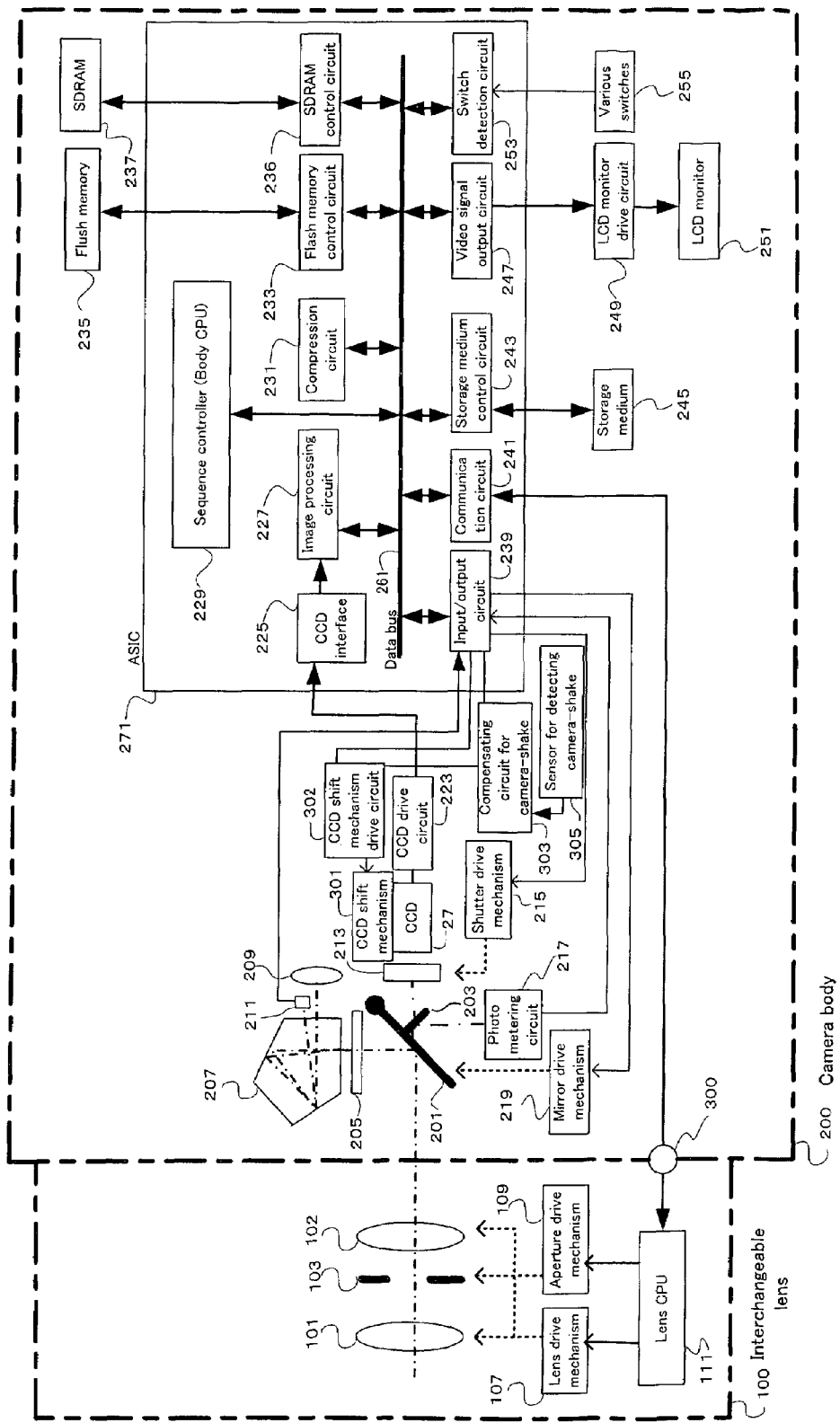
FIG. 1 is a block diagram showing the overall structure of a digital single lens reflex camera relating to a first embodiment of the present invention.

In the following, a preferred first embodiment using a digital single lens reflex adopting the present invention will be described using the drawings. FIG. 1 is a block diagram showing the overall structure of a digital single lens reflex camera relating to a first embodiment of the present invention, comprising an interchangeable lens 100 and a camera body 200. The interchangeable lens 100 is removably attached to mount opening section (not shown) on the front of the camera body 200. Subject light that is formed by a photographing lens comprised of lenses 101, 102 etc., within the interchangeable lens 100 passes through the mount opening section and is guided into the camera body 200. Within this embodiment, the interchangeable lens 100 and the camera body 200 are constructed separately, and the two are electrically connected by a communication contact 300

Lenses 101 and 102 for focusing and focal length adjustment, and an iris 103 for adjusting aperture are arranged inside the interchangeable lens 100. The lens 101 and the lens 102 are driven by a lens drive mechanism 107, while the aperture 103 is driven by the aperture drive mechanism 109. The lens drive mechanism 107 and the aperture drive mechanism 109 are respectively connected to a lens CPU 111, and this lens CPU 111 is connected to the camera body 200 by means of the communication contact 300. The lens CPU 111 performs control of the inside of the interchangeable lens 100, and performs focusing and zoom operations by controlling the lens drive mechanism 107, and control of an aperture value by controlling the aperture drive mechanism 109.

Inside the camera body 200, a rotatable movable mirror 201 is provided moving between a position inclined by 45 degrees with respect to the lens optical axis for reflecting a subject image to a viewfinder optical system and a raised up position for guiding the subject image to the image sensor (CCD 27 that will be described later). A focusing screen 205 for image forming the subject image is arranged above the movable mirror, 201 and a pentaprism 207 for lateral inversion of the subject image is arranged above this focusing screen 205. An ocular lens 209 for viewing the subject image is arranged at an outgoing side of this pentaprism 207 (the right side in FIG. 1), and a photosensor 211 is arranged next to the ocular lens at a position that does not obstruct viewing of the subject image. This photosensor 211 is constructed of an area with multiple photosensors for splitting the subject image and performing light measurements.

A half mirror is constructed close to the middle of the movable mirror 201, and a sub-mirror 203 for reflecting the subject image that has passed through the half mirror to a lower section of the camera body 200 is provided on a rear surface of the movable mirror 201. This sub-mirror 203 is capable of rotation with respect to the movable mirror 201, and when the movable mirror 201 is in the up position the submirror rotates to a position covering the half mirror part, while when the movable mirror 201 is in a subject image viewing position the sub-mirror 203 is at a position perpendicular to the movable mirror 201, as shown in the drawing. This movable mirror 201 is driven by a mirror drive mechanism 219. Also, a focus detecting circuit 217 including ranging sensor is arranged below the sub mirror 203, and this circuit measures deviations in focus of the subject image formed by the lenses 101 and 102.

A focal plane type shutter 213 for exposure time control is arranged behind the movable mirror 201, and drive control for this shutter 213 is performed by a shutter drive mechanism 215. A CCD (charge coupled Device) 27 is arranged behind the shutter 213 as an image sensor, and this CCD photo electrically converts a subject image formed by the lenses 101 and 102 into electrical signals. Within this embodiment, a CCD is used as the image sensor, but this is not limiting and it is also perfectly possible to use an imaging elements such as CMOS (Complementary Metal Oxide Semiconductor).

Although not shown in the drawing, an infrared cut filter for cutting an infrared light component from the subject light is arranged between the shutter 213 and the CCD 27, and an optical lowpass filter for removing high frequency components from the subject light is arranged behind this filter. The CCD 27 is then arranged behind the optical low pass filter. The infrared cut filter, optical lowpass filter and the CCD 27 are integrally housed in a hermetically sealed passage, constructed so that dust can not infiltrate inside the package.

A CCD shift mechanism 301 for driving the CCD 27 two-dimensionally in the X direction and the Y direction is provided close to the CCD 27. Actuators (stepping motors in this embodiment) for respectively driving in the X direction and Y direction are provided in the CCD drive mechanism 301, and these actuators are connected to the CCD shift mechanism 301. A CCD shift mechanism drive circuit 302 is respectively connected to an input/output circuit 239 and a compensating circuit for camera-shake 303. The compensating circuit for camera shake 303 is connected to a sensor for detecting camera shake 305.

Based on output of the camera shake sensor 305, the camera shake compensation circuit outputs signals to the CCD shift mechanism drive circuit 302 so as to counteractmovement of the camera body due to camera shake, and the CCD shift mechanism 301 performs drive of the CCD 27 based on drive signals from the CCD shift mechanism drive circuit 302. Also, at the time of removing dust that has become attached to the image sensor of the CCD 27, control signals from the input/output circuit 239 are sent to the CCD shift mechanism drive circuit 302, the CCD shift mechanism drive circuit 302 supplies drive signals for removing dust to the CCD shift mechanism 301 the CCD shift mechanism 301 holding the CCD 27 is driven to vibrate, thus removing dust. The CCD shift mechanism 301, CCD shift mechanism drive circuit 302 etc., will be described later using FIG. 2 and FIG. 3.

The CCD 27 is connected to the CCD drive circuit 223, and outputs of the CCD 27 are amplified by the CCD drive circuits 223 and subjected to analog to digital conversion (AD conversion). The CCD drive circuit 223 is connected to an image processing circuit 227 via the CCD interface 225. Various image processing such as digital amplification of digital image data (digital gain adjustment processing), color correction, gamma (γ) correction, contrast correction, monochrome/color mode processing etc., are carried out by the image processing circuit 227.

The image processing circuit 227 is connected to data bus inside an ASIC (Application Specific Integrated Circuit) 271. Besides the image processing circuit 227, later described components such as a sequence controller (hereafter referred to as a body CPU) 229, compression circuit 231, flash memory control circuit 233, SDRAM control circuit 236, input/output circuit 239, communication circuit 241, storage medium control circuit 243, video signal output circuit 247 and switch detection circuit 253 are connected to this device 261.

The body CPU 229 that is connected to the data bus 261 controls processes of this digital single lens reflex camera. Also, the compression circuit 231 connected to the data bus 261 is a circuit for compressing image data etc., stored in the SDRAM 237 using JPEG Also, at the time of playback, compressed image data is expanded and an image data is generated for display. The image compression is not limited to JPEG, and it is also possible to apply other compression methods. The flash memory control circuit 233 connected to the data bus 261 is connected to a flash memory 235, and this flash memory 235 stores programs for controlling the single lens reflex camera, and the body CPU 229 performs control of the single lens reflex camera in accordance with the programs stored in the flash memory 235. Incidentally, the flash memory 235 is an electrically rewritable non-volatile memory. The SDRAM 237 is connected via the SDRAM control circuit 236 to the data bus 261, and this SDRAM 237 temporarily stores image information subjected to image processing by the image processing circuit 227 or image information compression by the compression circuit 231.

The input/output circuit 239 connected to the above described photosensor 211, shutter drive mechanism 215, focus detecting circuit 217, mirror drive mechanism 219, CCD shift mechanism drive circuit 302 and camera shake compensation circuit 303 controls input and output of data to and from each of the circuits such as the body CPU 229, via the data bus 261. The communication circuit 241 that is connected to the lens CPU 111 via the communication contact 300 is also connected to the data bus 261, and carries out communication such as data exchange with the body CPU 229 and control commands. The storage medium control circuit 243 connected to the data bus 261 is connected to the storage medium 245, and performs control of storage such as image data to this storage medium 245. The storage medium 245 is constructed with a rewritable storage medium such as x D picture card (registered trademark), compact Flash (registered trademark), SD memory card (registered trademark) or memory stick (registered trademark) and is removably inserted into the camera body 200.

The video signal output circuit 247 connected to the data bus 261 is connected to a liquid crystal monitor 251 via a liquid crystal monitor drive circuit 249. The video signal output section 247 converts image data stored in the SDRAM 237 or the storage medium 245 into video signals for display on the liquid crystal monitor 251. The liquid crystal monitor 251 is arranged on the rear surface of the camera body 200, but as long as it is in a position that can be seen by the photographer it is not limited to the rear surface, and also is not limited to liquid crystal and can be another display device. Various switches 255, such as a switch for detecting a first stroke and second stroke of the shutter release button, and a zoom switch for instructing drive of a zoom lens, etc. are connected to the data bus 261 via a switch detection circuit 253.

Figure 2:
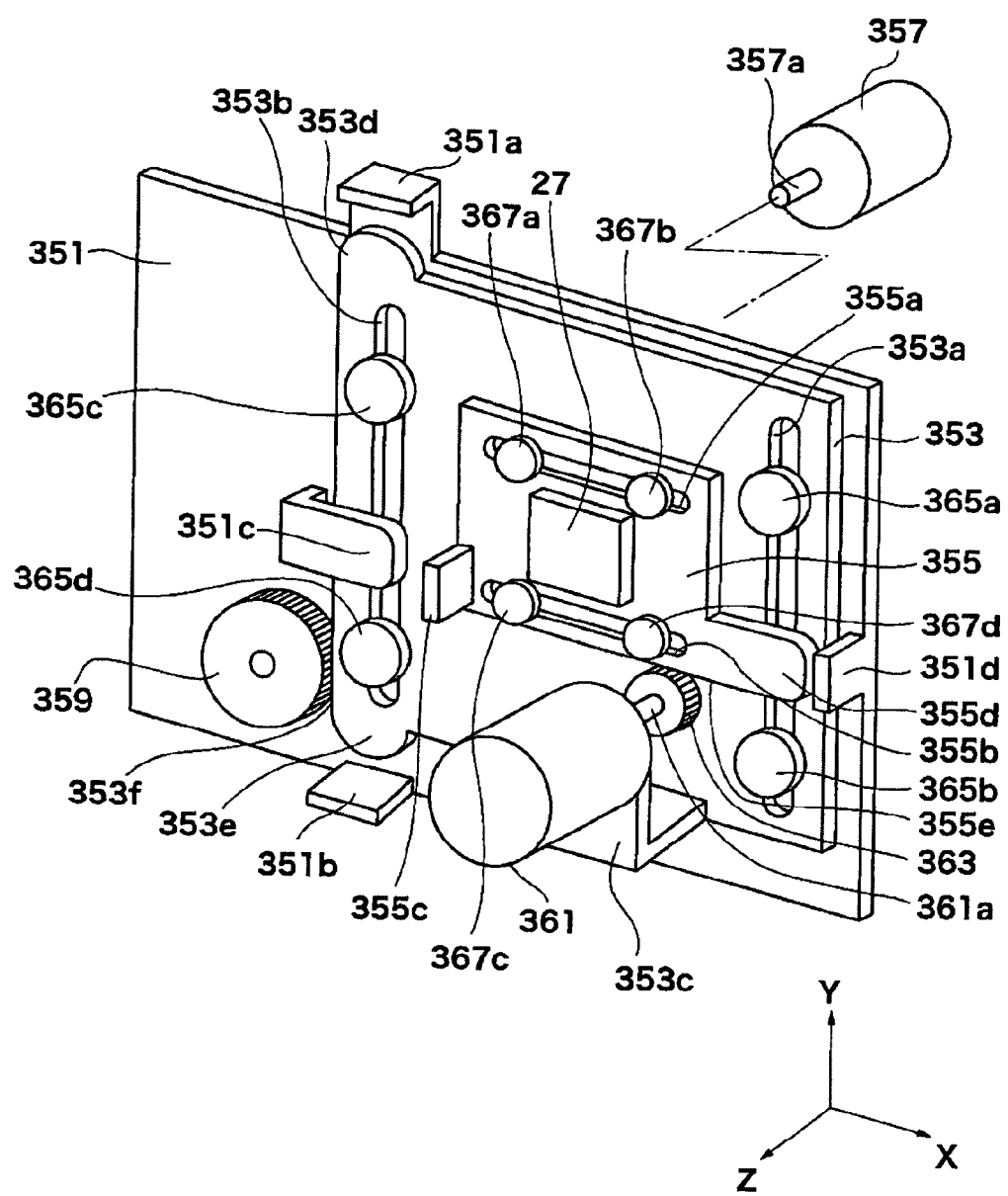
FIG. 2 is a perspective view showing the structure of a CCD shift mechanism of the first embodiment of the present invention.

Next, the structure of the CCD shift mechanism 301 of this embodiment will be described using FIG. 2. A base plate 351 formed as a flat plate is fixed to the camera body 200. An L-shaped contact section 351a is provided on an upper edge section of the base plate 351, and a contact section 351b formed jutting up from the base plate 351 is provided on a lower edge section. These contact sections 351a and 351b function as vertical drive range limiting sections for a first slider 353 that will be described later. Also, a contact sections 351c projecting in an L-shape is provided on left side plate of the base plate 351, and a contact section 351d formed jutting up from the base plate 351 is provided on a right side plate. These contact sections 351c and 351d function as lateral drive range limiting sections for a second slider 355 that will be described later.

Four pins 365a, 365b, 365c and 365d are provided on the base plate 351. These four pins 365a, 365b, 365c and 365d are fitted into elongated holes 353a and 353b of the first slider 353, and the first slider 353 slides freely up and down. Specifically, the vertically aligned pins 365a and 365b are fitted into the elongated hole 353a, and the similarly vertically aligned pins 365c and 365d are fitted into the elongated hole 353b, and the first slider 353 slides vertically, but does not slide laterally.

A projecting section 353d is provided at an upper edge section of the left side of the first slider 353, and a projecting section 353e is provided at a lower edge section. The first slider 353 is capable of moving upward until the projecting section 353d comes into contact with the above-described contact section 351a, and capable of moving downward until the projecting section 353e comes unto contact with the above-described contact section 351b.

Four pins 367a, 367b, 367c and 367d are provided on the first slider 353. The elongated holes 355a and 355b are fitted onto these four pins 367a, 367b, 367c and 367d, and the second slider 355 slides laterally. Specifically, the laterally aligned pins 367a and 367b are fitted into the elongated hole 355a, and the similarly vertically aligned pins 367c and 367d are fitted into the elongated hole 355b, and the second slider 355 slides laterally, but does not slide vertical.

A projecting section 355c formed rising up from the flat plate is provided on the left edge section of the second slider 355, and a projection section 355d is provided on the right edge section. The second slider 355 is capable of moving to the left until the projecting section 355c comes into contact with the above-described contact section 351c, and capable of moving to the right until the projecting section 355d comes unto contact with the above-described contact section 351d.

A stepping motor (hereafter referred to as a motor) 357 is fixed to the camera body 200, and a drive shaft 357a of the motor 357 is passed trough a hole, not shown, in the base plate 351 and integrally affixed to a drive gear 359. This drive gear 359 meshes with a spur gear 353f formed on a side wall of the left edge section of the first slider 353, and a so-called rack and pinion is formed by this drive gear 359 and spur gear 353f. Therefore, if the motor 357 rotates, the drive gear 359 rotates, and the first slider 353 that is meshed with the drive gear 359 slides vertically. In FIG. 2, only the drive gear 359 has been depicted as a gear in the drive power transmission system of the motor 357, but it goes without saying that a plurality of gears are provided in order to reduce the speed of the motor 357.

A stepping motor (hereafter referred to as a motor) 361 is fixed to the L-shaped projecting section 353c provided on the first slider 353, and a drive shaft 361a of the motor 361 is integrally fastened to a drive gear 363. This drive gear 363 meshes with a spur gear 355e, not shown, formed on a side wall of the lower edge section of the second slider 355, and a so-called rack and pinion is formed by this drive gear 363 and spur gear 355e. Therefore, if the motor 361 rotates, the drive gear 363 rotates, and the second slider 355 that is meshed with the drive gear 363 slides laterally. Similarly to the case of the vertical drive, in FIG. 2, only the drive gear 363 has been depicted as a gear in the drive power transmission system of the motor 361, but it goes without saying that a plurality of gears are provided in order to reduce the speed of the motor 361.

Since the CCD shift mechanism 301 is constricted in this way, if the motor 357 rotates, then the first slider 353 is capable of sliding vertically on the base plate 351 within a drive restriction range determined by the contact section 351a and the contact section 351b. Similarly, if the motor 361 rotates, the second slider 355 can slide laterally on the first slider 353 within a drive restriction range determined by the contact section 351c and the contact section 351d.

With this embodiment, the contact sections 351a, 351b, 351c and 351d are provided on the base plate 351, but this is not limiting and it is also possible to provide the contact sections 351c and 351d, for example, on the first slider 353. However, if the contact sections are provided on a movable member such as the first slider 353, there is a potential problem of adversely affecting the drive mechanism, and so it is preferable to provide the contact sections on fixed members.

Also, in this embodiment, four contact sections are provided, but since the drive range can also be controlled by the number of drive pulses to the stepping motors, it is also possible to provide more than four or less than four. In a case where the projecting section 353e collides with contact section 351b, resulting in stopping the first slider 353 in an abrupt manner, both the force of inertia as well as the force of gravity contribute to dust removing. Therefore, it is preferable to at least provide the contact section 351b. In this embodiment, the shift mechanism of the CCD 27 has been constructed using a rack and pinion, but this is not limiting and it is also possible to use various structures, such as a shift mechanism using piezoelectric elements, for example. It is also possible to adopt ultrasonic motors or DC motors as the motors. Also, although the drive directions of the first slider 353 and the second slider 355 are orthogonal to each other, this is not limiting and it is also possible to have a structure where they are respectively driven in a circular motion.

Figure 3:
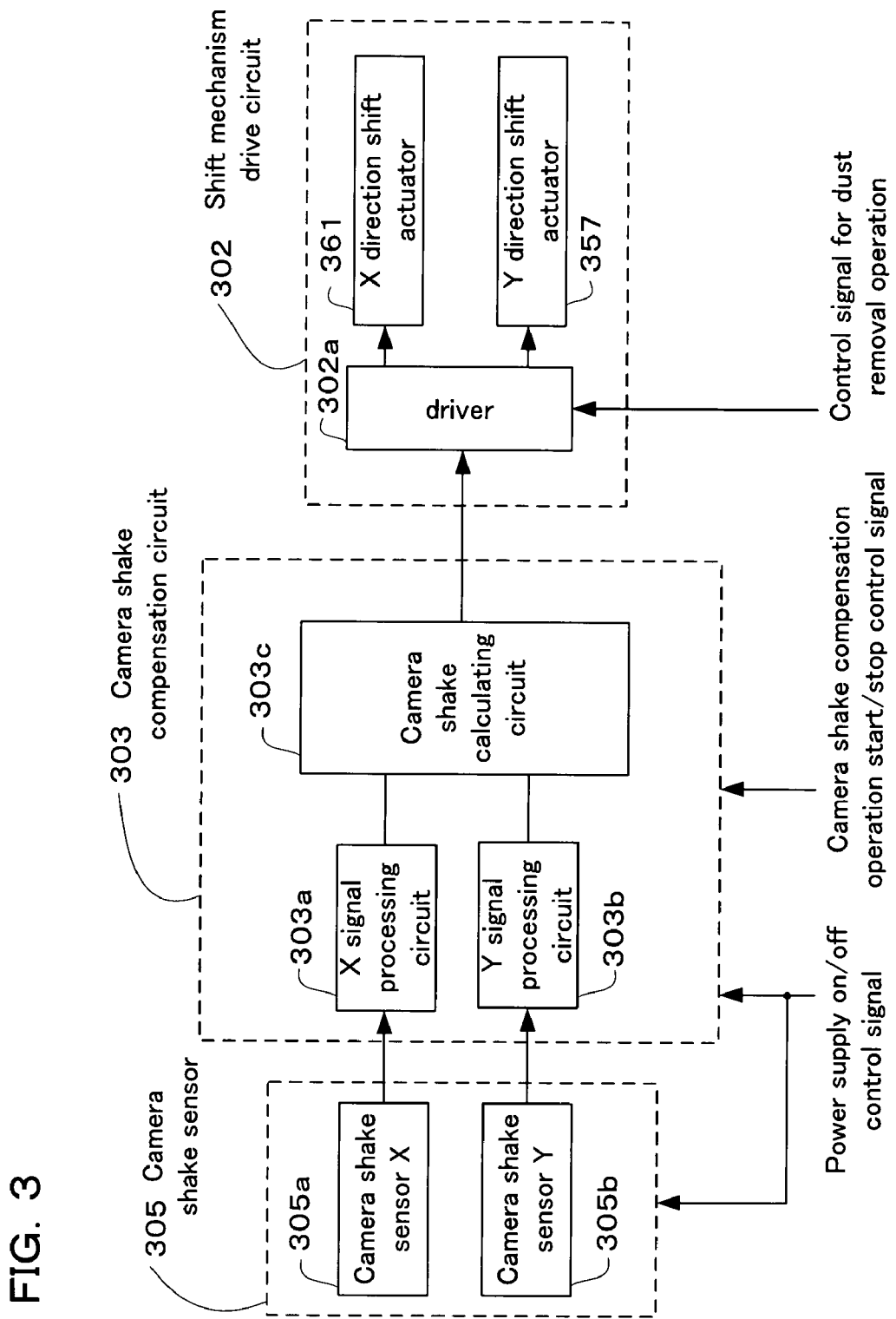
FIG. 3 is a block diagram showing detail of a CCD shift mechanism drive circuit, camera shake compensation circuit and camera shake sensor of the first embodiment of the present invention.

Next, the structure of the CCD shift mechanism drive circuit 302, camera shake compensation circuit 303 and camera shake sensor 305 will be described using FIG. 3. The camera shake sensor 305 comprises a camera shake sensor X 305a for detecting camera shake in the longitudinal direction of the camera body 200 (X axis in FIG. 2), as a first direction, and a camera shake sensor Y 305b for detecting camera shake in the vertical direction of the camera body 200 (Y axis in FIG. 2), as a second direction. Here, the camera shake sensors are constructed using well known gyros, angular velocity sensor, acceleration sensor or shock sensor etc.

The camera shake compensation circuit 303 comprises a X signal processing circuit 303a, a Y signal processing circuit 303b, and a camera shake calculating circuit 303c connected to outputs of these two signal processing circuits. The X signal processing circuit 303a is connected so that its input is the output of the camera shake sensor X 305a, and it processes signals relating to camera shake in the X axis direction, and outputs to the camera shake calculating circuit 303c. Also, the Y signal processing circuit 303b is connected so that its input is the output of the camera shake sensor Y 305b, and it processes signals relating to camera shake in the Y axis direction, and outputs to the camera shake calculating circuit 303c. The camera shake calculating circuit 303c calculates drive amounts required to eliminate camera shake in the X axis direction and Y axis direction respectively, and outputs such drive amounts to the CCD shift mechanism drive circuit 302.

The CCD shift mechanism drive circuit 302 comprises a driver 302a, an X direction shift actuator 361, and a Y direction shift actuator 357. These actuators correspond to the previously described stepping motor 361 and stepping motor 357 of FIG. 2. The X direction shift actuator 361 and the Y direction shift actuator 357 are respectively driven in accordance with respective outputs from the driver 302a.

The driver 302a is connected to the camera shake compensation circuit 303 so that its input is the output from the camera shake compensation circuit 303. Then, the driver 302a performs drive control of the X direction shift actuator 361 and the Y direction shift actuator 357 in accordance with output from the camera shake compensation circuit 303 to carry out a camera shake compensation operation.

Also, the driver 302a is constructed so as to also accept input control signals from the body CPU 229 via the input output circuit 239. Then, in the event that control signals from the body CPU 229 have been input, based on these signals the driver 302a performs drive control for the X direction shift actuator 361 and the Y direction shift actuator 357.

A power supply ON/OFF control signal output from the body CPU 229 via the input/output circuit 239 is applied to the camera shake sensor 305 and the camera shake compensation circuit 303, and power supply control is carried out based on this control signal. Also, a camera shake compensation operation start/stop control signal output from the body CPU 229 via the input/output circuit 239 is applied to the camera shake compensation circuit 303 and start and stop control of the camera shake compensation is carried out based on this control signal. If there is then a start control signal for the camera shake compensation operation, the camera shake compensation circuit 303 outputs control signals to the driver 302a of the shift mechanism drive circuit 302. Also, at the time of a dust removal operation, control signals are provided directly to the driver 302a of the shift mechanism drive circuit 302 via the input/output circuit 239. Specifically, at the time of a dust removal operation, the motors 357, 361 of the two actuators are driven regardless of any output of the camera shake compensation circuit 303.

In this way, it becomes possible to input control signals from the camera shake compensation circuit 303 and control signals from the body CPU 229 to the driver 302a, and it is therefore possible to drive the motors 357 and 361 of the two actuators based on one of the control signals depending on the operating state of the camera.

Figure 4:
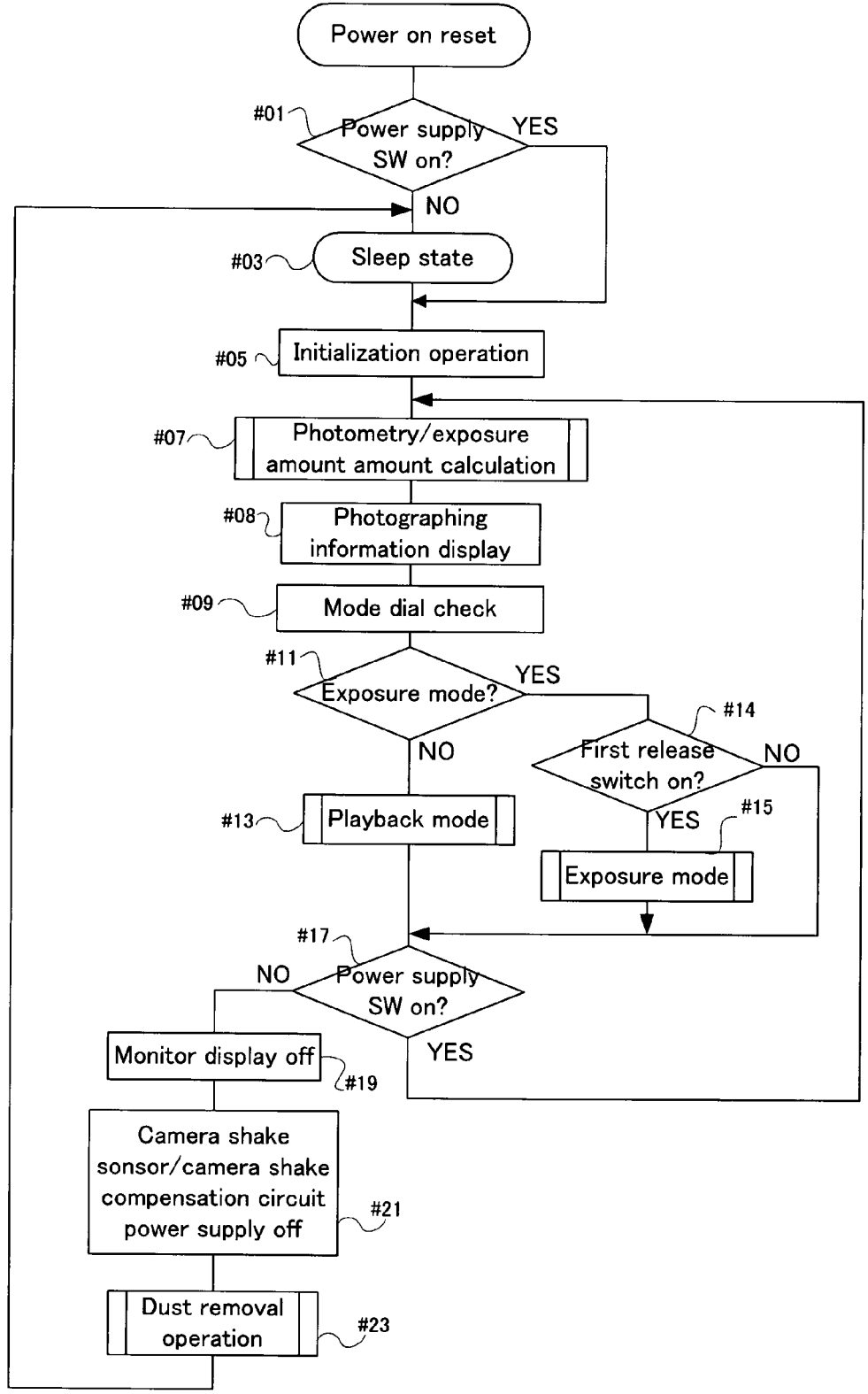
FIG. 4 is a flowchart showing a "power On Reset" of the first embodiment of the present invention.
Figure 5:
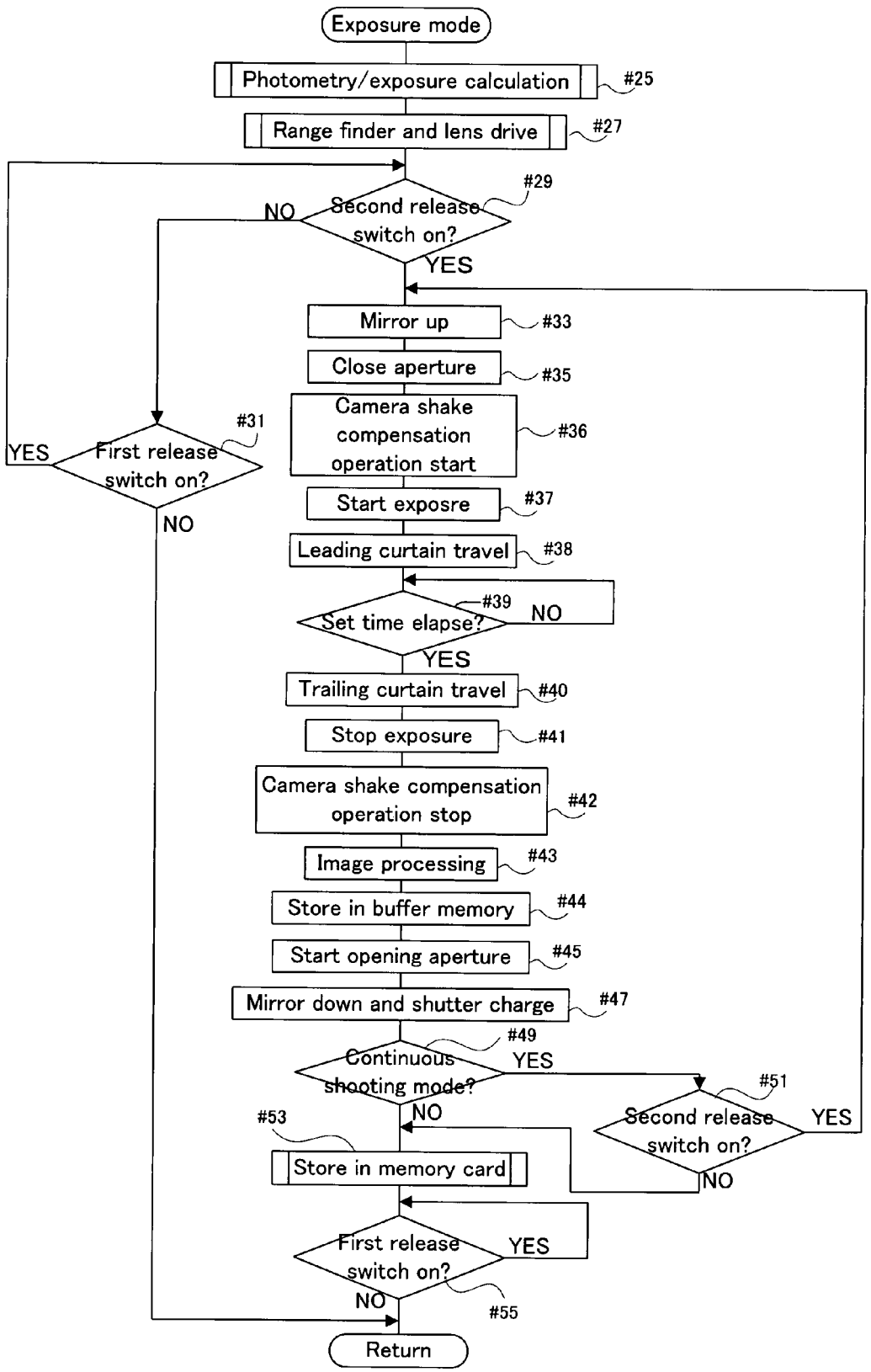
FIG. 5 is a flowchart showing a subroutine "imaging operation" of the first embodiment of the present invention.
Figure 6:
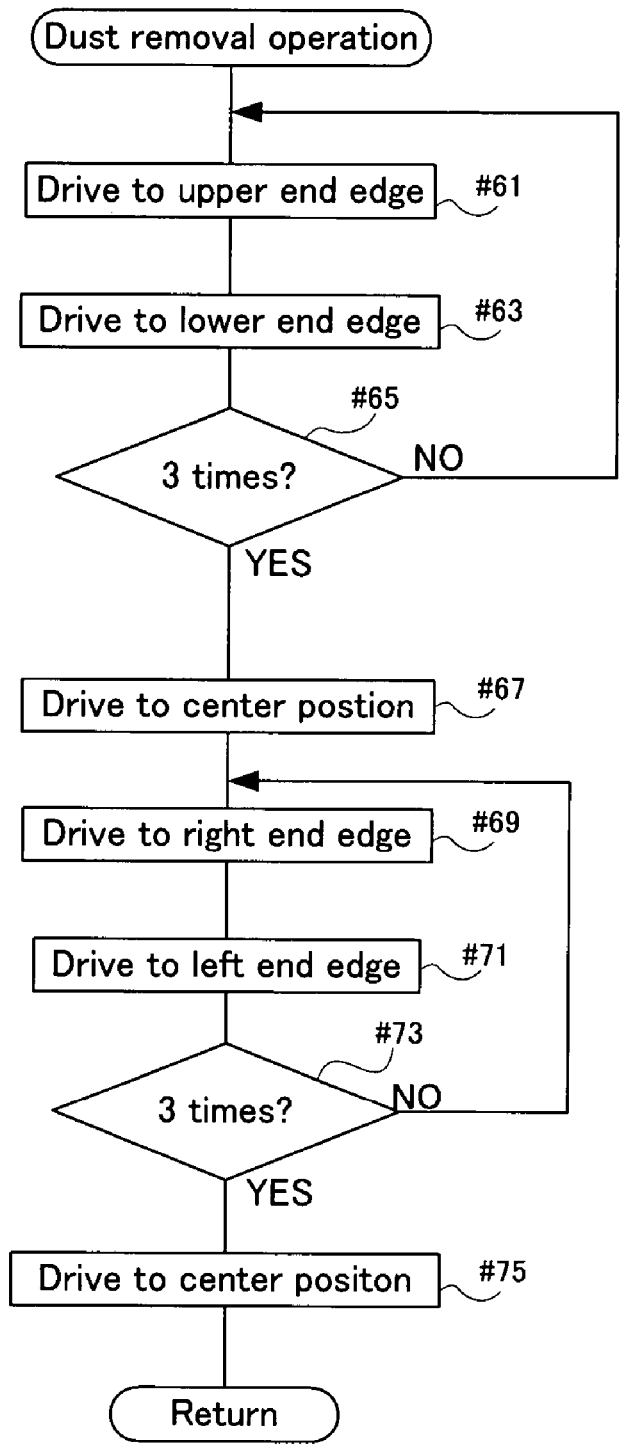
FIG. 6 is a flowchart showing a subroutine "dust removal operation" of the first embodiment of the present invention.

Next, operation of the digital single lens reflex camera of this embodiment will be described using the flowcharts of FIG. 4 to FIG. 6. First of all, if a power source battery is inserted into the camera body 200, the power on reset subroutine shown in FIG. 4 is launched. Once this subroutine starts, in step #01 it is determined whether or not the power switch, not shown, of the camera is on. If the power switch is off, processing transfers to step #03 and a sleep state is entered. This sleep state is a state where the body CPU 229 only receives an interrupt operation when the power switch changes to an on state, and even if other operational switches are operated no interrupt operation is received by the body CPU 229. The body CPU 229 only performs processing for state change of the power switch, and it is possible to conserve power.

In step #01, if the power switch is on, or if the power switch is turned on while in the sleep state, processing transfers to step #05 and an initialization operation is carried out. This initialization operation carries out electrical initialization and mechanical initialization. Electrical initialization is the resetting of various flags and counter values. Mechanical initialization is initialization of the movable mirror 201, shutter 213 etc., even if for whatever reason they were not driven to the end during operation and remain stopped at a midpoint. First, the state of each mechanism is detected, and if any mechanism is stopped at a midpoint that mechanism is driven to its initial position.

Continuing on, photometry and exposure amount calculations are carried out (#07). In particular, measurement of subject brightness BV which is based on the output of the photosensor 211 is performed. Subsequently, exposure control values such as shutter speed and aperture value from a known apex calculation based on this subject brightness BV are obtained. Once this photometry and exposure amount calculations are complete, exposure information is displayed (#08). Here, display of exposure mode, shutter speed TV value, aperture value AV and ISO sensitivity SV etc., is carried out on the liquid crystal monitor 251. The mode dial is then checked (#09). Here, based on the set state of the mode dial provided on the camera body 200, it is checked whether or not there is any change to various exposure modes, such as program mode, shutter speed priority mode, aperture priority mode, landscape mode, nightscene mode, macro mode etc., and mode settings such as playback mode for displaying image data stored in the storage medium 245 on the liquid crystal monitor 251.

Next, based on the results of checking the mode dial in step #09, it is determined whether or not exposure mode is set (#11). If the exposure mode is not set, processing advances to playback mode step #13 where images are displayed on the liquid crystal monitor 251 based on image data stored in the storage medium 245 or the SDRAM 237. On the other hand, if the exposure mode determined in step #11 is a set mode relating to exposure, such as program exposure mode, aperture priority exposure mode, shutter speed priority exposure mode, etc., then processing advances to step #14 where it is determined whether or not the first release switch is on, namely, whether or not the release button has been pressed halfway. If the first release button is on, processing advances to step #15 and processing for the set exposure mode is carried out. The exposure modes will be described later using FIG. 5.

If, during the course of execution of the playback of stored images in the playback mode of step #13 the playback mode is canceled, the release button is operated, or the power switch is turned off, the playback mode is terminated and processing advances to step #17. Also, if the exposure operation of step #15 is completed, or the first release switch is switched off, or the power switch is switched off, processing advances to step #17. Processing also advances to step #17 in the event that the first release switch is turned off in step #14. In step #17, the state of the power switch of the camera body is detected, and if the switch is on processing returns to step #07 and the previous steps are repeated.

On the other hand, if, in step #17, the result of determination is that the power switch is off, processing advances to step #19 and the display on the liquid crystal monitor 251 is stopped. Continuing on, power supply off control signals are output to the camera shake sensor 305 and the camera shake compensation circuit 303, and supply of power is stopped (#21). In the event that the camera shake compensation operation and the dust removal operation are carried out by the same shift mechanism, if signals for one operation are input while the other operation is in progress, there is a problem that the operation becomes unstable. Therefore, power supply to the camera shake sensor 305 and the camera shake compensation circuit 303 are stopped so that at least camera shake compensation signals are not generated while the dust removal operation is in progress. Also, stopping the supply of power to these circuits and devices, will conserve energy, and it is also possible to reduce the load at the time of the dust removal operation. Next, processing advances to step #23 where the dust removal operation is carried out using the CCD shift mechanism 301. This dust removal operation will be described later using FIG. 6. In this embodiment, the dust removal operation is carried out when the power switch is off, but this is not limiting and it is also possible, for example, to appropriately perform a dust removal operation at such a time as when the power switch is on, when the first release switch is on, or when the photographing lens is being fitted, Next, the exposure modes of step #15 will be described using FIG. 5. If exposure mode is entered, then similarly to step #07, measurement of the subject brightness is carried out based on the output of the photosensor 211, and shutter speed and/or aperture value are obtained from calculation based on the subject brightness obtained here. After that, deviations in focus of the lenses 101 and 102 are obtained by calculation based on the output of the focus detecting circuit 217, and based on these deviation amounts the lens drive circuit 107 is driven to achieve focus by means of the lens CPU 111 (#27).

If focus of the photographing lens is complete, it is next determined whether or not the second release switch is on as a result of the release button having been pressed fully down (#29), and if it is not on, it is determined whether or not the first release switch is on as a result of the release button being pressed halfway (#31). In the event that the switch is on, the lens button is in a half pressed state, but since it is not fully pressed down a standby state is entered where steps #29 and #31 are repeated. If the photographer lets go of the release button in step #31 and the first release switch goes off, then the NO route is taken and processing returns to the power on reset sub-routine shown in FIG. 4.

On the other hand, if the release button is pressed fully down, the second release switch will be on in step #29, as a result, processing is advanced to step #33 and subsequent processes are executed in order to carry out actual exposure and storage of image data. First of all, an operation to move the movable mirror 201 up is carried out (#33), hence, the subject light passing through the photographing lenses 101 and 102 is guided towards the shutter 213. Continuing on, along with starting of an operation to change the size of the aperture 103 (#35), a camera shake compensation operation is started as well (#36). As described previously, this camera shake compensation operation moves the CCD 27 by driving the CCD shift mechanism 302 in a direction that eliminates hand shake movement applied to the camera body 200 during an exposure operation, to cancel the effects of camera shake. As described previously, starting of the camera shake compensation operation is carried out by output of an operation start control signal to the camera shake compensation circuit 303 via the input/output circuit 239.

After the camera shake compensation operation has started, together with starting of the exposure of a subject image using the CCD 27 (#37), travel of the leading curtain of the shutter 213 commences (#38). Elapse of a set time corresponding to the shutter speed is awaited (#39), and once the set time elapsed processing advances to step #40 where travel of the trailing curtain of the shutter 213 commences (#40), the exposure operation by the CCD 27 is stopped (#41) and the camera shake compensation operation is stopped (#42). As described previously, stopping of the camera shake compensation operation is carried out by output of an operation stop control signal to the camera shake compensation circuit 303 via the input/output circuit 239.

If an instruction to stop the camera shake compensation operation of step #42 is output, the CCD drive circuit 223 reads image signals of the CCD 27 and executes image processing using the image processing circuit 227 (#43). Image data that has been subjected to this image processing is stored in a buffer memory such as the SDRAM 237 (#44). Continuing on, the open state of the aperture 103 is restored (#45), and together with moving the movable mirror 201 back down, the shutter charge is carried out (#47), and the viewfinder optical unit is put in a subject viewing state. The mirror down operation is carried out in response to an instruction to the mirror drive mechanism 219 by the body CPU 229 so that the movable mirror 201 that was raised up during exposure is returned to the lowered position shown in FIG. 1. Also, shutter charge is carried out mechanically and sequentially leading to the lowering of the movable mirror 201 so as to enter a shutter charge state from a state where travel of the shutter rear curtain is complete.

It is next determined whether or not the exposure mode is in the continuous shooting mode (#49), and in the event that continuous shooting mode is determined it is determined whether or not the release button is kept pressed completely down (#51). When the release is kept fully down, that is, the second release switch is on, processing returns to step #33 and exposure is repeated. Also, if the release button is let go, the second release switch becomes off and continuous shooting mode is completed (NO in #51). If it is not in the continuous shooting mode in step #49, or if continuous shooting mode is completed processing advances to step #53 where image data that has been stored in the buffer memory such as the SDRAM 237 is stored in the storage medium (memory card) 245 (#53). Continuing on, it is then determined if the release button is kept in the half pressed state, that is, whether or not the first release switch is on, and if it is determined to be on, the first release switch is waited in that state, and once the switch goes off, the power on reset sub-routine is returned.

Next, the dust removal operation shown in step #23 will be described using FIG. 6. First of all, the first slider 353 is driven to an upper end edge by the motor 357, being an actuator, that is, until the projecting section 353*d* of the first slider 353 comes into contact with the contact section 351*a* (#61). This driving is carried out by the motor 357, which is a stepping motor, which means that driving is carried out with a sufficient number of steps to drive to the upper end edge, and to cause the projecting section 353*d* to impact strongly with the contact section 351*a*. Dust that is attached to the CCD 27 shaken off by the acceleration applied to the CCD 27 at the time of this impact. Specifically, since the CCD 27 stops rapidly, dust attached to the CCD 27 is removed by the inertial force.

Continuing on, the first slider 353 is driven from the upper end edge towards the lower end edge (#63). Specifically, driving is carried out until the projection section 353*e* of the first slider 353 contacts the contact section 351*b*. At this time, driving is carried out with a sufficient number of steps to drive from the upper end edge to the lower end edge, and to cause the projecting section 353*e* to impact strongly with the contact section 35 lb. Dust that is attached to the CCD 27 is shaken off by the acceleration applied at the time of this impact.

Next, it is determined whether or not a count value for the number of times up and down driving is carried out in step #61 and #63 has reached three (#65). If the number of up and down drives has not reached three, processing returns to step #61 and the driving described above is repeated. The number of times of driving up and down is not limited to three, and may be an appropriate number of times to remove dust. If the number of times of up and down drive has reached three, drive is performed to a center position (#67). This is because when carrying out camera shake compensation, if the CCD 27 is at a neutral position such as the center position it is possible to carry out camera shake compensation over a wide range. At the time of commencing drive to the center position, the first slider 353 is at the lower end edge, and so drive of the motor 357 is only carried out for a number of steps of the motor 357 from the lower end edge to the center position.

Once the centering operation of the first slider 353 is completed, a dust removal operation using lateral drive of the second slider 355 is carried out. First of all, the second slider 355 is driven to the right end by the motor 361, being an actuator, that is, until the projecting section 355d of the second slider 355 comes into contact with the contact section 351d (#69). This driving is also carried out by the motor 361, which is a stepping motor, which means that driving is carried out with a sufficient number of steps to drive to the right end, and to cause the projecting section 355d to impact strongly with the contact section 35 Id. Dust that is attached to the CCD 27 is shaken off by the acceleration applied at the time of this impact.

Continuing on, the second slider 355 is driven from the right end towards the left end (#71). Specifically, driving is carried out until the projection section 355c of the second slider 355 contacts the contact section 351c. At this time, driving is carried out with a sufficient number of steps to drive from the right end to the left end, and to cause the projecting section 355c to impact strongly with the contact section 351c. Dust that is attached to the CCD 27 is shaken off by the acceleration applied at the time of this impact.

Next, similarly to step #65, it is determined whether or not lateral drive has been carried out three times (#73), and until it has been carried out three times the operation of steps #69 and #71 are repeated. The number of times of lateral driving is not limited to three, and may be an appropriate number of times to remove dust. If the number of times of lateral drive has reached three, drive is performed to a center position (#75). At the time of commencing drive to the center position, the second slider 355 is at the left end, and so drive of the motor 361 is only carried out for a number of steps of the motor 361 from the left end position to the center position. Once the centering operation is complete, the power on reset routine is returned to.

With the first embodiment of the present invention as described above, in steps #61 to #65, drive is performed to an upper end and lower end in a first drive direction, and after that in steps #69 to #73 drive is performed in a second drive direction to a right end and a left end, and at this time, since vibrating drive is carried out to contact (impact) at respective ends, which is different from simple movement for camera shake compensation, it is possible to effectively remove dust.

Also, with the first embodiment of the present invention, when shifting the first slider 353 towards the lower end, gravitational force is also in effect, making it possible to more effectively remove dust. Accordingly, even if vibratory drive in the second direction is omitted and only vibratory drive in the first direction is carried out, a certain degree of effectiveness is obtained. At this time, it should be possible to reduce the time taken by the dust removal operation. Incidentally, the gravitational direction may also differ depending on the way the photographer is holding the camera body, and in the case of a normal orientation, that is, with the camera held in a longitudinal orientation for landscape capture, the first direction is the gravitational force direction.

Further, with the first embodiment of the present invention, drive control is carried out so that acceleration is applied to the image sensor. In other words, since dust is shaken off as a result of negative acceleration when the first slider 353 and the second slider 355 make contact (impact), that is due to inertial force acting on the dust at the time of contact (impact), it is possible to perform effective dust removal.

Next, a second embodiment of the present invention will be described using FIG. 7. The dust removal operation of the first embodiment is carried out using impact when the respective sliders collide with contact members at the upper end edge, lower end edge, right end edge and left end edge, but with the second embodiment each slider is driven little by little and dust is moved using the acceleration each time the drive is stopped. The structure and operation of the second embodiment is common with the first embodiment apart from the sub-routine of the dust removal operation shown in FIG. 7, and only this different dust removal operation sub-routine will be described.

Figure 7:
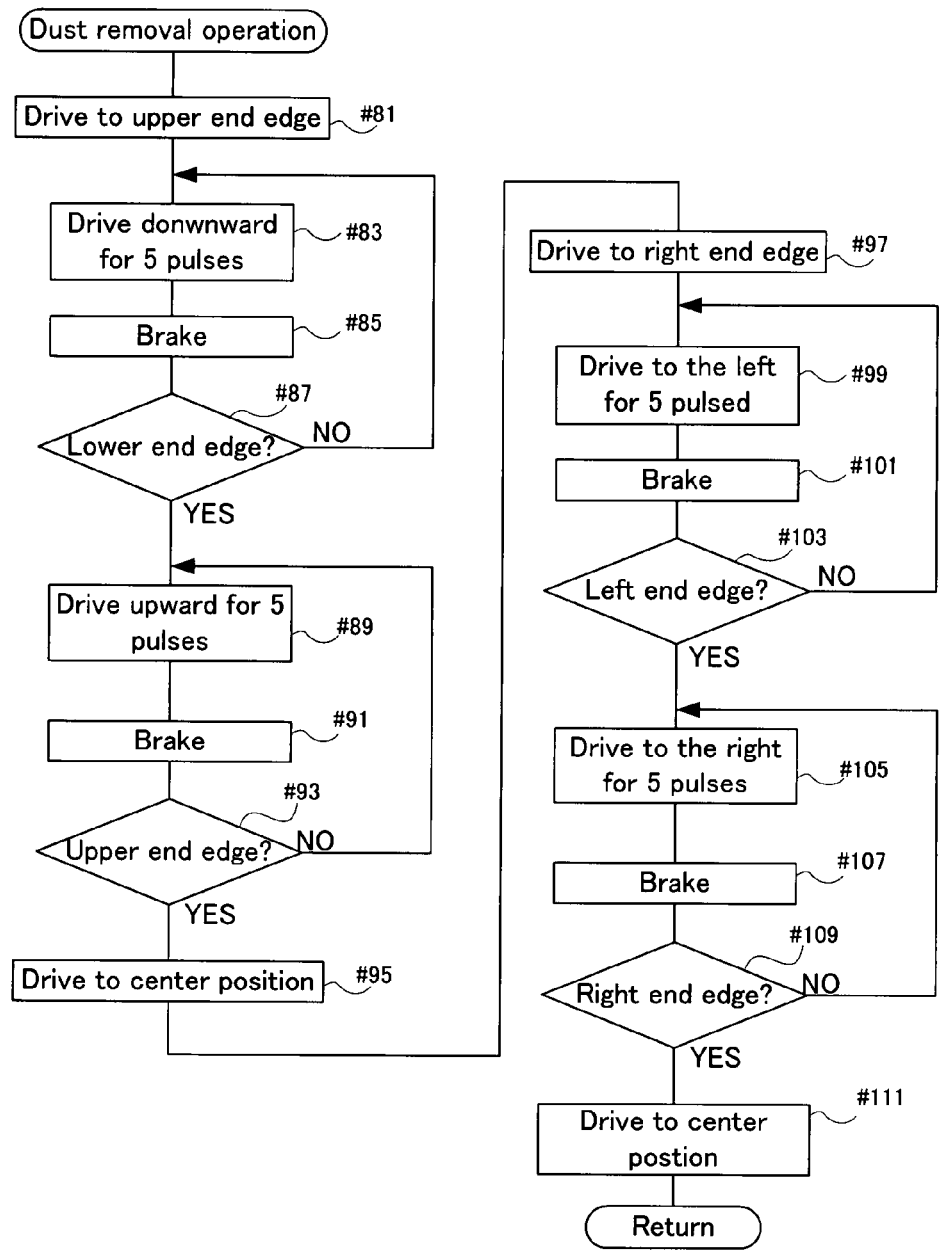
FIG. 7 is a flowchart showing a subroutine "dust removal operation" of a second embodiment of the present invention.

If the dust removal operation subroutine of FIG. 7 is entered, the first slider 353 is moved to the upper end edge (#81). Similarly to the first embodiment, this drive can be such that the projecting section 353d makes strong contact with the contact section 351a, but there is no problem if only gentle contact is made with the upper end edge. Continuing on, the motor 357, which is a stepping motor, is driven downwards for five pulses (#83), and stopped by applying a brake (#85). At the time of this stopping, acceleration is applied to the CCD 27, which is the image sensor, that is, dust is shaken off by inertial force acting on the dust at the time of applying the brake. Therefore, the more abrupt the stop, the larger the acceleration and the dust removing effect.

It is next determined if the first slider 353 has reached the lower end edge (#87), and if it has not reached the lower end edge, processing returns to step #83 wherein steps #83 to #87 are repeated. Whether or not the lower side edge has been reached can be determined by counting the number of drive pulses from the upper end edge. In this embodiment, the little by little drive and braking are repeated as far as the lower end edge, but it is not absolutely necessary to reach the lower end edge. Also, the brake is applied every five pulses, but the number of pulses can be changed.

In step #87, if it is determined that the lower end edge has been reached, the first slider 353 is then driven upwards for five pulses from the lower end edge (#89). If drive for five pulses is completed, the brake is applied and dust is shaken off using acceleration (#91). The accumulative number of drive pulses from the upper end edge is then counted, and it is determined whether or not the upper end edge has been reached based on this count value (#93). If the upper end edge has not been reached, processing returns to step #89 and the driving described above is repeated. It is also possible to not drive as far as the upper end edge, but instead to drive on the way towards the upper end edge and to have a number of pulses other than five. The little by little drive and braking are repeated, and if the upper end edge is reached driving is then carried out to a center position (#95). This can be done by only a number of pulses required to operate the motor 357 in order to drive the first slider 353 to the center position from the upper end edge position.

Once the centering operation is completed, processing transfers to a dust removal operation using lateral drive of the second slider 355. First of all, by driving the motor 361 the second slider 355 is moved to the right end (#97). Similarly to case of step #81, this drive can be such that the projecting section 355b makes strong contact with the contact section 351d, but there is no problem if only gentle contact is made with the right end edge. If the second slider 355 reaches the right end edge, the second slider 355 is then pulse driven by the motor 361 for five pulses to the left (#99), and the brake is applied (#101). At this time, similarly to steps #85 and #91, acceleration is applied to the CCD 27, that is, dust is shaken off by inertial force acting on the dust at the time of applying the brake.

It is next determined if the second slider 355 has reached the left end edge (#103), and if it has not reached the left end edge processing returns to step #99 wherein steps #99 to #103 are repeated. Whether or not the left side edge has been reached can be determined by counting the number of drive pulses from the right end edge. In this embodiment, the little by little drive and braking are repeated as far as the left end edge, but it is not absolutely necessary to reach the left end edge. Also, the brake is applied every five pulses, but the number of pulses can be changed.

In step #103, if it is determined that the left end edge has been reached, the second slider 355 is then driven to the right for five pulses from the left end edge (#105). If drive for five pulses is completed, the brake is applied and dust is shaken off (#107). The accumulative number of drive pulses from the left end edge is then counted, and it is determined whether or not the right end edge has been reached based on this count value (#109). If the right end edge has not been reached, processing returns to step #105 and the driving described above is repeated. It is also possible to not drive as far as the right end edge, but instead to drive on the way towards the right end edge and to have a number of pulses other than five, similarly to the case for leftward drive.

The little by little drive and braking are repeated, and if the right end edge is reached driving is then carried out to a center position (#111). This can be done by only a number of pulses required to drive the motor 361 in order to move the second slider 355 to the center position from the right end edge position. By doing this, it is possible to rapidly start camera shake compensation The above described second embodiment of the present invention also achieves the same effects as the first embodiment. In particular, the vibratory drive of steps #81 to #93 and steps #97 to #109, and more specifically the little by little drive and braking are repeated. Therefore, differing from the simple drive for camera shake compensation, it is possible to effectively remove dust.

With the first and second embodiments of the present invention, the first slider 353 and second slider 355 of the CCD shift mechanism 301 are stopped so as to impart acceleration to the image sensor. Therefore, differing from the case of applying pulses required to drive the motors 357 and 361 in order to carry out camera shake compensation of the image sensor, it is possible to effectively remove dust. There are various methods of stopping to impart acceleration, such as the method of the first embodiment that contacts (impacts) the contact sections 351a, 351b, 351c and 351d, and the method of the second embodiment where the little by little drive and stopping operations are repeated.

Also, with the first and second embodiments of the present invention, after completion of the vibratory drive, the CCD shift mechanism 301 is moved to a central position that is suitable for the camera shake compensation operation by the camera shake compensation circuit 303. It is therefore possible to rapidly perform camera shake compensation after the dust removal operation. As the central position, as well as the central position in the drive range of the embodiments, there is also no problem in having a position where the image sensor is driven when the power supply is turned on.

Also, these embodiments are examples where the present invention is applied to a digital single lens reflex camera, but is not limited to a single lens reflex camera and it is also possible to apply the invention to an interchangeable lens type digital camera or a normal compact digital camera. The present invention can also obviously be applied to an imaging apparatus inside various units such as a mobile telephone, and also to dedicated cameras fitted to various units such as microscopes, binoculars etc. In order to eliminate camera shake in a subject image, it is possible to apply the present invention to an imaging apparatus having a camera shake compensation unit for shifting the image sensor.

What is claimed is:

1. An image pickup apparatus, comprising:
an image sensor for acquiring subject images via a photographing lens;
a shift mechanism, holding the image sensor, capable of moving the image sensor in a first direction orthogonal to the optical axis of the photographing lens, and in a second direction that is different from the first direction;
an optical element, arranged in front of the image sensor, that is displaced by the shift mechanism together with the image sensor;
a drive circuit including a first actuator for driving the shift mechanism along a first direction, a second actuator for driving the shift mechanism along a second direction, and a driver for supplying electric power to the first actuator and the second actuator;
a camera shake sensor for detecting vibration applied to the imaging apparatus;
a camera shake compensation circuit for providing a control signal for a camera shake compensation operation according to output of the camera shake sensor;
a controller for providing a control signal for a dust removal operation for driving the shift mechanism along a specified direction a plurality of times, the controller disconnecting a power supply to the camera shake sensor before driving the shift mechanism to execute the dust removal operation.

2. The image pick up apparatus of claim 1, wherein the shift mechanism has stoppers for limiting the drive range of a movable section that displaces the image sensor, and the controller drives the movable section in the dust removal operation so as to contact the stoppers.

3. The image pickup apparatus of claim 2, wherein the controller drives the shift mechanism in the dust removal operation so as to contact the stoppers in the direction of gravity.

4. The image pickup apparatus of claim 2, wherein the controller drives the movable section in the dust removal operation so as to contact the stoppers a plurality of times.

5. The image pickup apparatus of claim 4, wherein the controller drives the shift mechanism in the dust removal operation so that acceleration is imparted to the image sensor in the direction of gravity.

6. The image pickup apparatus of claim 1, wherein the controller drives the shift mechanism along one of the first direction and the second direction in the dust removal operation, wherein the controller only drives the shift mechanism along a single one of the first and second directions at any given time during the dust removal operation.

7. The image pickup apparatus of claim 6, wherein the controller drives the shift mechanism along the first direction in the dust removal operation, then drives the shift mechanism along the second direction in the dust removal operation.

8. The image pickup apparatus of claim 1,
wherein the controller executes a first dust removal operation to drive only the first actuator to move the shift mechanism along the first direction.

9. The image pickup apparatus of claim 8, wherein the controller executes the first dust removal operation, and then drives the shift mechanism to a neutral position of the drive range of the shift mechanism.

10. The image pickup apparatus of claim 8, wherein the controller executes a second dust removal operation to drive only the second actuator to drive the shift mechanism along the second direction.

11. The image pickup apparatus of claim 10, wherein the controller executes the first dust removal operation, and then executes the second dust removal operation.

12. The image pickup apparatus of claim 11, wherein the controller drives the first actuator to drive the shift mechanism to a neutral position in the drive range of the first direction before executing the second dust removal operation.

13. The image pickup apparatus of claim 1, further comprising:
a display panel capable of displaying an image, wherein
before the controller executes the dust removal operation display of the display panel is turned off.

14. An image pickup apparatus, comprising:
an image pickup means for acquiring subject images via a photographing lens;
shift drive means, holding the image pickup means, capable of moving the image pickup means in a first direction orthogonal to the optical axis of the photographing lens, and in a second direction that is different from the first direction;
an optical element, arranged in front of the image pickup means, that is displaced by the shift drive means together with the image pickup means;
camera shake compensation means for providing a control signal for a camera shake compensation operation to the shift drive means based on output of a camera shake sensor for detecting vibration applied to the image pickup apparatus; and
control means for providing a control signal for the shift drive means for the dust removal operation for removing dust that has become attached to the surface of the optical element, the control means disconnecting a power supply to the camera shake sensor before driving the shift drive means to execute the dust removal operation.

15. The image pickup apparatus of claim 14, wherein the control means drives the shift drive means along one of a first direction and a second direction in the dust removal operation, wherein the controller only drives the shift mechanism along a single one of the first and second directions at any given time during the dust removal operation.

16. The image pickup apparatus of claim 14, wherein further comprising:
display means capable of displaying an image, wherein
the control means turns display of the display means off before the dust removal operation.

17. A dust removing method, for removing dust that has become attached to an optical element surface that moves integrally with an image sensor, comprising the steps of:
stopping power supply to a camera shake compensation circuit for outputting drive signals to a camera shake compensation mechanism, for driving the image sensor along a plane orthogonal to the image sensor's light receiving surface, according to vibration applied to a device; and
executing a dust removal operation by driving a shift mechanism regardless of signals from the camera shake compensation circuit.

18. The dust removal method of claim 17, wherein, after execution of the dust removal method the shift mechanism is driven to a neutral position in the drive range of the shift mechanism.

19. The dust removal operation. of claim 17, wherein before the dust removal operation is performed, display of an image on display means is turned off.

* * * * *